(12) United States Patent
Tiruveedhula

(10) Patent No.: US 11,301,896 B2
(45) Date of Patent: Apr. 12, 2022

(54) INTEGRATING THIRD-PARTY ANALYTICS WITH VIRTUAL-ASSISTANT ENABLED APPLICATIONS

(71) Applicant: Oracle International Corporation, Redwood Shores, CA (US)

(72) Inventor: Pratyusha Tiruveedhula, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 16/543,439

(22) Filed: Aug. 16, 2019

(65) Prior Publication Data

US 2021/0042786 A1    Feb. 11, 2021

Related U.S. Application Data

(63) Continuation-in-part of application No. 16/537,498, filed on Aug. 9, 2019, now abandoned.

(51) Int. Cl.
*G06Q 30/00*        (2012.01)
*G06Q 30/02*        (2012.01)
(Continued)

(52) U.S. Cl.
CPC ....... *G06Q 30/0254* (2013.01); *G06F 16/248* (2019.01); *G06F 16/24522* (2019.01);
(Continued)

(58) Field of Classification Search
CPC ............. G06F 16/24522; G06F 16/248; G06F 16/252; G06N 20/00; G06N 7/005;
(Continued)

(56) References Cited

U.S. PATENT DOCUMENTS 10,110,738 B1 * 10/2018 Sawant ................ H04M 3/436
10,929,392 B1 *  2/2021 Cheng ..................... G06N 3/08
(Continued)

OTHER PUBLICATIONS

Dimitrios Rafailidis and Yannis Manolopoulos, Can Virtual Assistants Produce Recommendations? Apr. 25, 2019, WIMS2019: Proceedings of the 9th International Conference on Web Intelligence, Mining and Semantics Jun. 2019 (Year: 2019).*

*Primary Examiner* — E Carvalho
(74) *Attorney, Agent, or Firm* — Invoke

(57) ABSTRACT

Techniques for integrating third-party analytics with virtual-assistant enabled applications are disclosed. A third-party analytics service trains a machine learning model, using labeled training data including (a) phrases corresponding to sales offers made to consumers and (b) sales conversion outcomes associated with the phrases. The service receives, from a consumer-facing application, a user query submitted via a virtual assistant interface. The service applies the user query to the machine learning model, to obtain a recommended phrase for the consumer-facing application to use in response to the user query. The recommended phrase is: based on one or more of the phrases used to train the machine learning model; responsive to the user query; and based on a likelihood of achieving a sales objective associated with the consumer-facing application. The service transmits the recommended phrase to the consumer-facing application, to use when supplying a response to user query via the virtual assistant interface.

20 Claims, 7 Drawing Sheets

(51) Int. Cl.
*G06N 20/00* (2019.01)
*G06F 16/248* (2019.01)
*G06F 16/2452* (2019.01)
*G06F 16/25* (2019.01)

(52) U.S. Cl.
CPC .......... *G06F 16/252* (2019.01); *G06N 20/00* (2019.01); *G06Q 30/0256* (2013.01)

(58) Field of Classification Search
CPC ...... G06N 5/003; G06N 3/08; G06Q 30/0254; G06Q 30/0256
See application file for complete search history.

(56) References Cited

U.S. PATENT DOCUMENTS

| | | | |
|---|---|---|---|
| 2011/0119050 A1* | 5/2011 | Deschacht | G06F 40/216 704/9 |
| 2016/0196820 A1* | 7/2016 | Williams | G06F 3/167 704/244 |
| 2016/0239568 A1* | 8/2016 | Packer | G06F 16/951 |
| 2017/0270544 A1* | 9/2017 | Jaidka | G06N 7/005 |
| 2018/0183660 A1* | 6/2018 | Byers | H04L 41/0803 |

\* cited by examiner

INTEGRATING THIRD-PARTY ANALYTICS WITH VIRTUAL-ASSISTANT ENABLED APPLICATIONS

BENEFIT CLAIMS; RELATED APPLICATIONS; INCORPORATION BY REFERENCE

This application is a Continuation-in-Part and claims the benefit of U.S. patent application Ser. No. 16/537,498, filed Aug. 9, 2019, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to data analytics. In particular, the present disclosure relates to third-party analytics.

BACKGROUND

A virtual assistant is a software service that performs tasks in response to user input (e.g., voice input or text input). The user input is a request for the virtual assistant to perform a particular task. A user request may take many different forms, such as a question (e.g., "What is the weather today?"), an instruction (e.g., "Tell me the weather today"), a sentence fragment (e.g., "today's weather"), or a single word (e.g., "weather"). Typically, a virtual assistant is not limited to performing tasks using a single software application. A virtual assistant may access application programming interfaces (API's) of various software applications and/or services, in order to perform tasks based on user requests. Depending on the specific implementation, examples of tasks that a virtual assistant may perform include, but are not limited to: scheduling a reminder; checking the weather; controlling music or video playback; launching an application; checking a calendar for appointments; scheduling an appointment; placing an audio and/or video call; checking voicemail; sending a text message; dictating a received text message or email; setting a timer; checking stocks; performing unit conversions (e.g., miles to kilometers); solving math problems; controlling camera functions; enabling and/or disabling hardware features (e.g., Bluetooth or wi-fi); searching the Internet; providing directions to a location; etc.

Some virtual assistants are included with consumer hardware, such as smartphones, tablets, televisions, speakers, etc. Examples of virtual assistants included with consumer hardware include, but are not limited to: Apple Siri®; Google Assistant™; and Amazon Alexa™. Alternatively or additionally, virtual assistants may be used in other contexts, such as call-in centers or online customer support. Many different kinds of virtual assistants exist.

Many different kinds of software applications provide many different kinds of information to users. In general, those users may be referred to as 'consumers' because they consume (i.e., receive and/or otherwise utilize) the goods and/or services supplied by the applications. Such applications may therefore be referred to as consumer-facing applications. In general, developers of consumer-facing applications seek to provide goods and/or services to consumers, via the consumer-facing applications, in a timely and relevant manner. In addition, in general, developers of consumer-facing applications seek to make consumer-facing applications as accessible and user-friendly as possible. In many cases, a given consumer-facing application only has access to data that is received and/or generated directly by that consumer-facing application itself. Being limited to data that is received and/or generated directly by the consumer-facing application itself may hinder efforts to provide goods and/or services to consumers in a timely and relevant manner.

Data analytics is the practice of identifying patterns and/or otherwise deriving meaning from one or more data sets. Data analytics may provide insights into data that are not possible when simply inspecting the raw data. A third-party data analytics service is a service that provides data analytics to customers as a service. The term 'third-party' refers to the fact that the data analytics service operates independent of both the software application(s) that supply the raw data and the user device(s) that interact with the software application(s). For example, a company that develops a software application may subscribe to a third-party analytics service to obtain additional insights into the data received and/or generated by the software application. Many different third-party analytics services exist. In addition, third-party analytics features may be included in a service that also provides other features. For example, Oracle Responsys is a third-party marketing orchestration platform that includes marketing analytics features.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
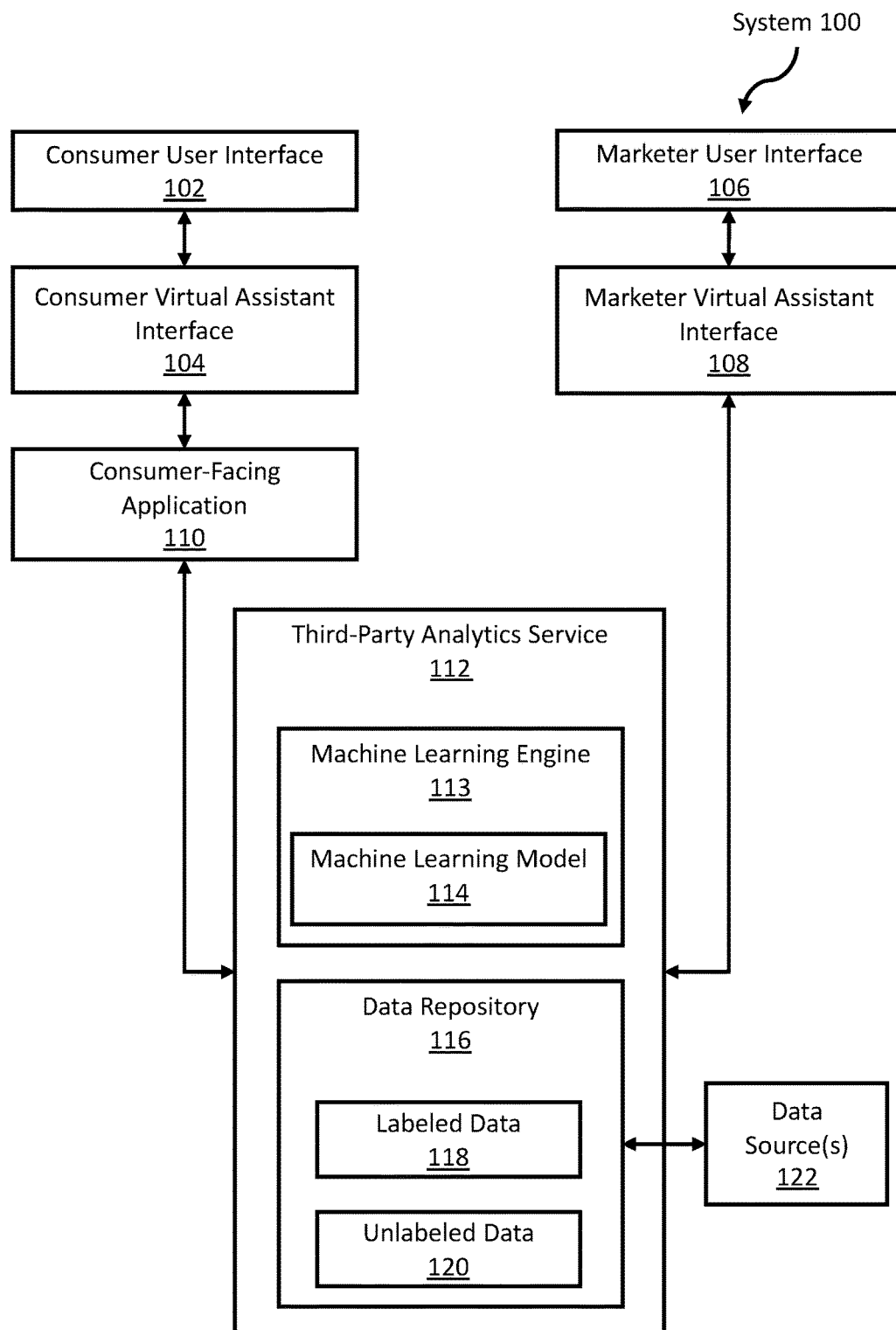
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. INTEGRATING THIRD-PARTY ANALYTICS WITH A VIRTUAL-ASSISTANT ENABLED APPLICATION
4. PROVIDING THIRD-PARTY ANALYTICS VIA A VIRTUAL ASSISTANT INTERFACE
5. ILLUSTRATIVE EXAMPLES
    5.1. INTEGRATING THIRD-PARTY ANALYTICS WITH A VIRTUAL-ASSISTANT ENABLED APPLICATION
    5.2. PROVIDING THIRD-PARTY ANALYTICS VIA A VIRTUAL ASSISTANT INTERFACE
6. MISCELLANEOUS; EXTENSIONS
7. HARDWARE OVERVIEW
8. COMPUTER NETWORKS AND CLOUD NETWORKS
9. MICROSERVICE APPLICATIONS

1. General Overview

One or more embodiments include techniques for integrating third-party analytics with virtual-assistant enabled applications. A third-party analytics service trains a machine learning model, using labeled training data including (a) phrases corresponding to sales offers made to consumers and (b) sales conversion outcomes associated with the phrases. The third-party analytics service receives, from a consumer-facing application, a user query submitted via a virtual assistant interface. The third-party analytics service applies the user query to the machine learning model, to obtain a recommended phrase for the consumer-facing application to use in response to the user query. The recommended phrase is: based on one or more of the phrases used to train the machine learning model; responsive to the user query; and based on a likelihood of achieving a sales objective associated with the consumer-facing application. The third-party analytics service transmits the recommended phrase to the consumer-facing application, to use when supplying a response to user query via the virtual assistant interface.

Alternatively or additionally, one or more embodiments include techniques for providing third-party analytics via a virtual assistant interface. A third-party analytics service trains a machine learning model, based at least on interaction histories of users of a consumer-facing application. The interaction histories include sales data associated with the users. The third-party analytics service receives, via a virtual assistant interface, a request for a recommended marketing strategy to be targeted at one or more users of the consumer-facing application. The third-party analytics service applies the request to the machine learning model, to obtain the recommended marketing strategy responsive to the request. The recommended marketing strategy is based at least on a predicted effectiveness of the recommended marketing strategy targeted at the one or more users of the consumer-facing application. The third-party analytics service presents, via the virtual assistant interface, the recommended marketing strategy responsive to the request.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a consumer user interface 102, consumer virtual assistant interface 104, consumer-facing application 110, marketer user interface 106, marketer virtual assistant interface 108, one or more data sources 122, third-party analytics service 112, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In general, in an embodiment, a user interface refers to hardware and/or software configured to facilitate communications between a user and a hardware and/or software product. A consumer user interface 102 refers to hardware and/or software configured to facilitate communications between a consumer and a consumer-facing application 110. A marketer user interface 106 refers to hardware and/or software configured to facilitate communications between a marketer and a third-party analytics service 112. For example, the marketer user interface 106 may be a user interface used by marketers to review marketing data maintained by the third-party analytics service 112 and/or obtain recommended marketing strategies from the third-party analytics service. Each of the consumer user interface 102 and the marketer user interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the consumer user interface 102 and/or the marketer user interface 106 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the consumer user interface 102 and/or the marketer user interface 106 may be specified in one or more other languages, such as Java, C, or C++.

In general, in an embodiment, a virtual assistant interface refers to hardware and/or software configured to receive user input (e.g., voice and/or text input) and process the user input to obtain a corresponding query and/or instruction to be transmitted to a hardware and/or software product (e.g., a consumer-facing application 110 and/or a third-party analytics service 112), referred to generally here as a 'product' for ease of discussion. Alternatively or additionally, a virtual assistant interface may receive data from a product and generate a corresponding message (e.g., a voice and/or text message) to present to a user in a user interface. For example, a virtual assistant interface may include an application programming interface (API) configured to receive queries and/or instructions from a user interface and/or a product. The API may be accessible to multiple user interfaces and/or multiple products. After receiving user input, a virtual assistant interface may process the user input to determine which product(s) the corresponding query and/or instruction is directed to.

Referring to FIG. 1, a consumer virtual assistant interface 104 refers to a virtual assistant interface configured to process communications, as described herein, between a consumer user interface 102 and a consumer-facing application 110. A marketer virtual assistant interface 108 refers to a virtual assistant interface configured to process communications, as described herein, between a marketer user interface 106 and a third-party analytics service 112. A consumer virtual assistant interface 104 and marketer virtual assistant interface 108 may be a same kind of virtual assistant interface or different kinds of virtual assistant interfaces.

In an embodiment, a consumer-facing application 110 refers to hardware and/or software configured to supply one or more the goods and/or services to one or more users, who may also be referred to as consumer(s). Examples of consumer-facing applications 110 include, but are not limited to: a calendar application; a weather application; a music player; a video player; a task management application; a voice calling and/or conferencing application; a video calling and/or conferencing application; a text message application; a ticketing application (e.g., for finding times and/or purchasing tickets to movies, concerts, stage performances, etc.); a shopping application; etc. In an embodiment, the consumer-facing application 110 is configured to transmit data to a third-party analytics interface 112, as discussed herein, to obtain data to be provided to a user in response to a user query and/or instruction. The consumer-facing application 110 may be virtual-assistant enabled, i.e., capable of receiving user input via a consumer virtual assistant interface 104 and/or presenting data to a user via a consumer virtual assistant interface 104.

In an embodiment, a third-party analytics service 112 refers to hardware and/or software configured to provide data analytics to customers as a service. Specifically, the third-party analytics service 112 may be configured to provide data analytics for one or more consumer-facing applications 110. Alternatively or additionally, the third-party analytics service 112 may be configured to present marketing insights, based at least in part on data analytics, to one or more marketers via a marketer user interface 106. The third-party analytics interface 112 may be virtual-assistant enabled, i.e., capable of receiving user input via a marketing virtual assistant interface 108 and/or presenting data to a user via a marketing virtual assistant interface 108.

In an embodiment, a third-party analytics service 112 performs data analytics using a machine learning engine 113. Machine learning includes various techniques in the field of artificial intelligence that deal with computer-implemented, user-independent processes for solving problems that have variable inputs. The third-party analytics service 112 may be configured to use the machine learning engine 113 to perform one or more operations, described herein, to provide data analytics for a consumer-facing application 110 and/or to determine a recommended marketing strategy.

In embodiment, the machine learning engine 113 trains a machine learning model 114 to perform one or more operations. Training a machine learning model 114 uses training data to generate a function that, given one or more inputs to the machine learning model 114, computes a corresponding output. The output may correspond to a prediction based on prior machine learning. In an embodiment, the output includes a label, classification, and/or categorization assigned to the provided input(s). The machine learning model 114 corresponds to a learned model for performing the desired operation(s) (e.g., labeling, classifying, and/or categorizing inputs).

In an embodiment, the machine learning engine 113 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. Techniques for supervised learning include regression analysis and classification analysis. Regression analysis predicts numerical values. Examples of regression analysis techniques include, but are not limited to, linear regression and/or polynomial regression. Linear regression computes a linear function, using techniques such as root mean squared error and gradient descent. Polynomial regression computes an nth degree polynomial. Classification analysis predicts categorical values. Examples of classification analysis techniques include, but are not limited to, logistic regression, K-nearest neighbor, and/or decision trees. Logistic regression estimates a probability, which may correspond to the probability of a binary response (e.g.: true or false; on or off; etc.) or may be expanded to predict among more than two categories. K-nearest neighbor measures nearness for each dimension that is used for a given classification, with the K (a threshold value) nearest classified neighbors determining the value for the item in question, Decision trees use decision rules in a tree-like model, to determine a result (e.g., classification) at a 'leaf' of the decision tree. In semi-supervised learning, some inputs are associated with supervisory signals and other inputs are not associated with supervisory signals. In unsupervised learning, the training data does not include supervisory signals. Examples of unsupervised learning techniques include, but are not limited to, K-means clustering and/or principal component analysis. K-means clustering partitions data into clusters, with K referring to the target number of clusters. Principal component analysis determines, from among multiple features of a data set, the one or more features that account(s) for the most variability in the data set. Reinforcement learning uses a feedback system in which the machine learning engine 113 receives positive and/or negative reinforcement in the process of attempting to solve a particular problem (e.g., to optimize performance in a particular scenario, according to one or more predefined performance criteria). In an embodiment, the machine learning engine 113 initially uses supervised learning to train the machine learning model 114 and then uses unsupervised learning to update the machine learning model 114 on an ongoing basis.

In an embodiment, a machine learning engine 113 may use many different techniques to label, classify, and/or categorize inputs. A machine learning engine 113 may transform inputs into feature vectors that describe one or more properties ("features") of the inputs. The machine learning engine 113 may label, classify, and/or categorize the inputs based on the feature vectors. Alternatively or additionally, a machine learning engine 113 may use clustering (also referred to as cluster analysis) to identify commonalities in the inputs. The machine learning engine 113 may group (i.e., cluster) the inputs based on those commonalities. The machine learning engine 113 may use hierarchical clustering, k-means clustering, and/or another clustering method or combination thereof. In an embodiment, a machine learning engine 113 includes an artificial neural network. An artificial neural network includes multiple nodes (also referred to as artificial neurons) and edges between nodes. Edges may be associated with corresponding weights that represent the strengths of connections between nodes, which the machine learning engine 113 adjusts as machine learning proceeds. Alternatively or additionally, a machine learning engine 113 may include a support vector machine. A support vector machine represents inputs as vectors. The machine learning engine 113 may label, classify, and/or categorizes inputs based on the vectors. Alternatively or additionally, the machine learning engine 113 may use a naïve Bayes classifier to label, classify, and/or categorize inputs. Alternatively or additionally, given a particular input, a machine learning model may apply a decision tree to predict an output for the given input. Alternatively or additionally, a machine learning engine 113 may apply fuzzy logic in situations where labeling, classifying, and/or categorizing an input among a fixed set of mutually exclusive options is impossible or impractical. The aforementioned machine learning model 114 and techniques are discussed for exemplary purposes only and should not be construed as limiting one or more embodiments.

In an embodiment, as a machine learning engine 113 applies different inputs to a machine learning model 114, the corresponding outputs are not always accurate. As an example, the machine learning engine 113 may use supervised learning to train a machine learning model 114. After training the machine learning model 114, if a subsequent input is identical to an input that was included in labeled training data and the output is identical to the supervisory signal in the training data, then output is certain to be accurate. If an input is different from inputs that were included in labeled training data, then the machine learning engine 113 may generate a corresponding output that is inaccurate or of uncertain accuracy. In addition to producing a particular output for a given input, the machine learning engine 113 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the system 100 includes a data repository 116. A data repository 116 may be configured to store labeled data 118. As described above, labeled data 118 includes input/output pairs in which each input is labeled with a desired output (e.g., a label, classification, and/or categorization), also referred to as a supervisory signal. The third-party analytics service 112 may use the labeled data 118 to train a machine learning model 114. The labeled data 118 may include one or more phrases (i.e., sentences and/or sentence fragments) corresponding to sales offers made to users of a consumer-facing application 110. Alternatively or additionally, the labeled data 118 may include one or more records of interactions of users with a consumer-facing application 110. Such interactions may include, but are not limited to: clicks; swipes; taps; purchases; sales inquiries; requests for information; and/or any other kind of user interaction or combination thereof with a consumer-facing application 110. Alternatively or additionally, the labeled data 118 may include demographic data associated with users of a consumer-facing application 110. Demographic data may include age data, gender data, location data, income data, interests, preferences, and/or any other kind of demographic data or combination thereof. Demographic data may be anonymized. For example, the data source(s) 122 may include one or more data providers that supply demographic data, which may be anonymized, as a subscription service. Labeled data 118 may include many different kinds of data.

In an embodiment, supervisory signals associated with the labeled data 118 include sales conversion outcomes (e.g., opt-ins, purchases, contacts with sales representatives, and/or any other kind of data corresponding to a user's conversion from one phase in a purchasing process to another phase in the purchasing process). For example, sales conversion outcomes may associated with particular phrase(s), user interactions, demographic profiles, and/or any other kind of data. Using sales conversion outcomes as supervisory signals may allow the third-party analytics service 112 to predict a phrase and/or other course of action, from a set of available phrases and/or courses of action, that is most likely to result in a sales conversion in a particular situation.

Alternatively or additionally, a data repository 116 may be configured to store unlabeled data 120. Unlabeled data 120 is data that does not include supervisory signals. For example, unlabeled data 120 may include data that is received and/or generated by a consumer-facing application 110, without any process for assigning a supervisory signal to that data. In general, unlabeled data 120 may include one or more kinds of data described above with respect to labeled data 118, but without any supervisory signal(s). Unlabeled data 120 may include many different kinds of data.

In an embodiment, a data repository 116 is any type of storage unit and/or device (e.g., a file system, database, collection of tables, or any other storage mechanism) for storing data. Further, a data repository 116 may include multiple different storage units and/or devices. The multiple different storage units and/or devices may or may not be of the same type or located at the same physical site. Further, a data repository 116 may be implemented or may execute on the same computing system as one or more other components of the system 100. Alternatively or additionally, a data repository 116 may be implemented or executed on a computing system separate from one or more other components of the system 100. A data repository 116 may be communicatively coupled to one or more other components of the system 100 via a direct connection or via a network.

Information describing labeled data 118 and/or unlabeled data 120 may be implemented across any of components within the system 100. However, this information is illustrated within the data repository 116 for purposes of clarity and explanation.

In an embodiment, a third-party analytics service 112 is configured to receive data (e.g., labeled data 118 and/or unlabeled data 120) from one or more data sources 122. The data source(s) 122 may include one or more consumer-facing applications (e.g., consumer-facing application 110 and/or one or more other consumer-facing applications (not shown)). Alternatively or additionally, the data source(s) 122 may include one or more user interfaces. For example, the third-party analytics service 112 may be configured to receive data entered manually by a user in a marketer user interface 106. In an embodiment, the third-party analytics service 112 combines data from multiple data sources 122. Combining data from multiple data sources 122 may allow the third-party analytics service 112 to provide more timely and/or relevant data analytics (e.g., using machine learning to identify data patterns across multiple data sets from different data sources 122) than if the third-party analytics service 112 were to use data from only a single data source 122.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
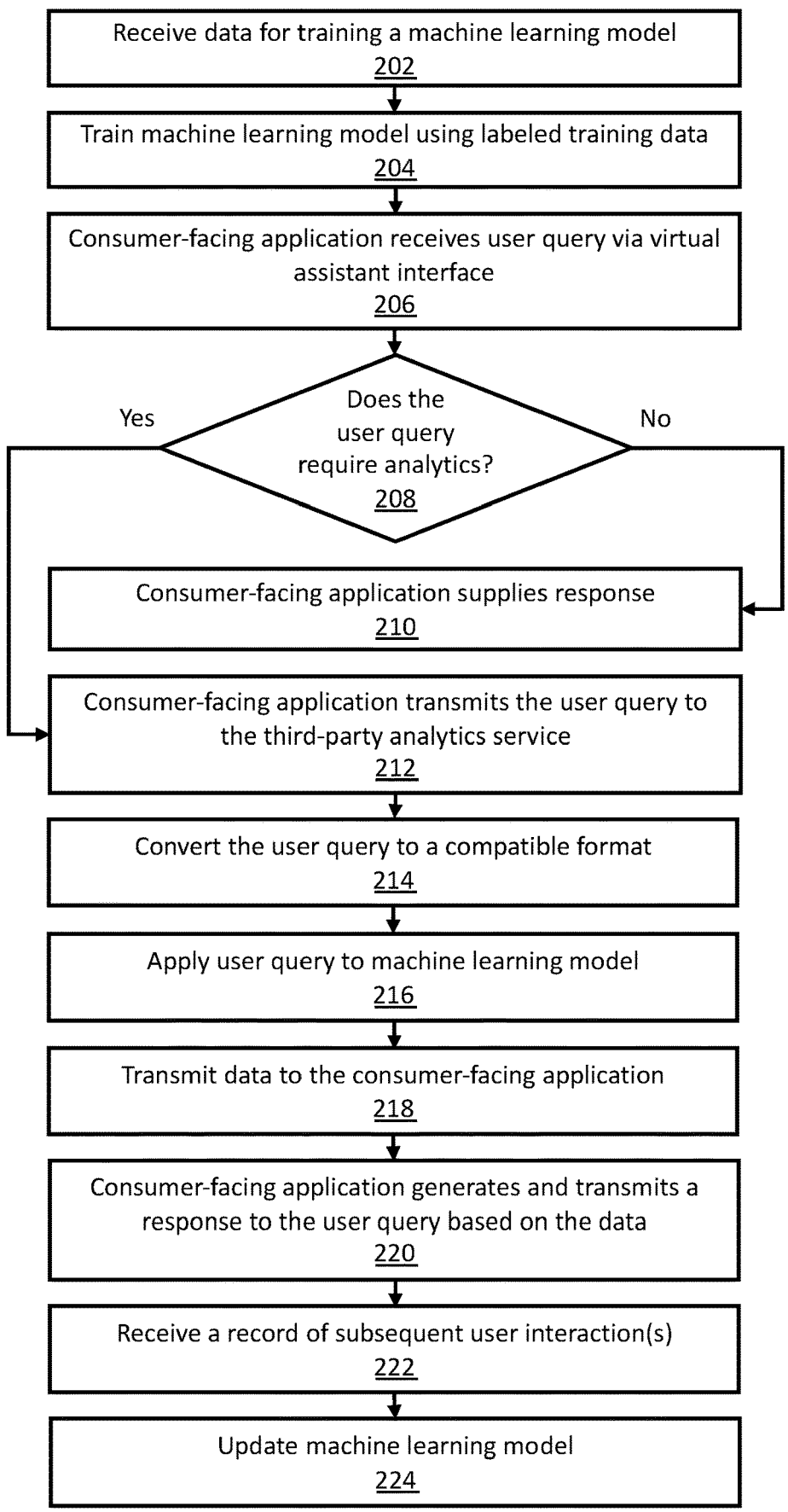
FIG. 2 illustrates a set of operations for integrating third-party analytics with a virtual-assistant enabled application in accordance with one or more embodiments.

3. Integrating Third-Party Analytics with a Virtual-Assistant Enabled Application FIG. 2 illustrates an example set of operations for integrating third-party analytics with a virtual-assistant enabled application in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a third-party analytics service receives data for training a machine learning model (Operation 202). As discussed above, the third-party analytics service may receive the data from one or more data sources (e.g., one or more consumer-facing applications) operating independent of the third-party analytics service. The data may include labeled and/or unlabeled data. The data may include one or more of: phrases (i.e., sentences and/or sentence fragments) corresponding to sales offers made to users of a consumer-facing application; records of user interactions with a consumer-facing application; demographic data; sales conversion outcomes; and/or any other kind of data.

In an embodiment, the third-party analytics service trains a machine learning model using labeled training data (Operation 204). The third-party analytics service may train the machine learning model using labeled training data in which phrases (i.e., sentences and/or sentence fragments) corresponding to sales offers made to users of a consumer-facing application are mapped to supervisory signals that include sales conversion outcomes associated with the corresponding phrases. In an embodiment, the third-party analytics service uses classification analysis to classify the different phrases. Examples of classification analysis are discussed above. Alternatively or additionally, the third-party analytics service may train the machine learning model using another kind of labeled training data or combination thereof. In an embodiment, the machine learning model is trained to predict, from a set of available options, the most effective option for a given user query, which may correspond to a particular category of query. The set of available options may include phrases and/or portions of phrases to present in marketing messages. Alternatively or additionally, the set of available options may include one or more filters (or categories of filters) to apply to a set of available products. Alternatively or additionally, the set of available options may include different steps (or categories of steps) in a sales campaign workflow (e.g., initial contact, follow-up contact, promotional offer, etc.). The machine learning model may be configured to select from among many different kinds of options and/or combinations thereof. In an embodiment, the machine learning model is configured to predict which option, from the set of available options, is most likely to result in a user taking a particular action. For example, the machine learning model may be configured to predict which option is mostly likely to result in the user buying a product or service, and/or advancing to a next step in a sales campaign workflow. The machine learning model may be configured to provide many different kinds of information, based on many different inputs and/or criteria.

In an embodiment, a consumer-facing application receives a user query via a virtual assistant interface (Operation 206). In one example, a user of the consumer-facing application speaks the user query as voice input to a user interface (e.g., a voice input interface in a mobile device and/or another kind of user interface). The user interface transmits the user query as voice input to the virtual assistant interface. The virtual assistant interface performs speech-to-text processing to convert the user query to text. The virtual assistant interface then transmits the text version of the user query to the consumer-facing application. The consumer-facing application may receive the user query in many different ways.

In an embodiment, the consumer-facing application determines whether the user query requires analytics (Operation 208). The consumer-facing application may be configured to respond to some user queries without relying on third-party analytics. In one example, a movie ticketing application is configured to provide movie showtimes. If the user query requests showtimes for a specific movie, at a specific location, on a specific day, then the movie ticketing application may respond to the user query with the requested showtimes, without relying on any third-party analytics. In general, in an embodiment, if the user query does not require analytics, then the consumer-facing application supplies a response to the user query (Operation 210). Specifically, the consumer-facing application generates the response and transmits the response to the user (e.g., via the virtual assistant interface) without involving the third-party analytics service.

In an embodiment, if the user query requires analytics, the consumer-facing application transmits the user query to the third-party analytics service (Operation 212). In an embodiment, the third-party analytics service converts the user query (Operation 214) to a format that is compatible with the machine-learning model. Alternatively or additionally, the virtual assistant interface and/or consumer-facing application may perform some or all of the conversion. Converting the user query may normalize the user query by, for example, removing superfluous terms (e.g., prepositions and/or other terms lacking semantic significance). Converting the user query may associate the user query with a user intent, i.e., an expressed desire by the user for the consumer-facing application to perform a particular task (e.g., provide a particular set of information). Alternatively or additionally, the third-party analytics system may store the full user query as the user intent.

In an embodiment, converting the user query to a compatible format uses semantic analysis. Semantic analysis refers to programmatic techniques for determining a meaning associated with words in a human language (i.e., individual words, sentences, passages, etc.). As one example, the user query includes words in a human language, e.g., in the form of a natural language question and/or instruction. Semantic analysis may determine a meaning associated with the user query. The meaning may correspond to a user intent. The meaning determined by semantic analysis may correspond to a predicted meaning based on analysis of prior inputs. Many different techniques for semantic analysis exist. In an embodiment, semantic analysis uses machine learning to determine a meaning by applying the input word(s) to a machine learning model, which may be the same or different from a machine learning model used for other purposes described herein. Alternatively or additionally, semantic analysis may use semantic analysis techniques that do not involve machine learning. For example, semantic analysis may process input against a fixed grammar and vocabulary, using decision tree analysis and/or another form of semantic analysis techniques or combination thereof.

In an embodiment, the third-party analytics service applies the user query to a machine learning model (Operation 216), to obtain data that the consumer-facing application can use to generate a response to the user query. For example, if the user query is a request for information, the machine learning model may supply a phrase, or portion thereof, to use when providing the requested information. The phrase may include one or more placeholders for additional data (e.g., movie names and/or times, product information, etc.) to be supplied by the consumer-facing application itself. As another example, if the user query is a request for information about products for sale, the machine learning model may supply one or more filters to apply to a set of available products based on the user query. As another example, the machine learning model may indicate a next step in a sales campaign workflow based on the user query.

In an embodiment, the third-party analytics system transmits the data (e.g., the phrase, filter, sales campaign workflow step, and/or other kind of data or combination thereof), supplied by the machine learning model, to the consumer-facing application (Operation 218). Based at least in part on the data from the third-party analytics system, the consumer-facing application generates a response to the user query and transmits the response to the user (Operation 220). To generate the response, the consumer-facing application may combine the data received from the third-party analytics service with data from the consumer-facing application itself. For example, the third-party analytics service may supply a marketing phrase with a placeholder for product-specific information. The consumer-facing application may replace the placeholder with product-specific information and transmit the completed phrase to the user in response to the user query.

In an embodiment, after the user receives the response from the consumer-facing application, the user may take one or more actions using the consumer-facing application. For example, after receiving the response, a user may purchase a product, navigate to a different screen in the consumer-facing application, stop using the consumer-facing application, and/or take any other kind of action or combination thereof with respect to the consumer-facing application. The consumer-facing application may transmit, and the third-party analytics service may receive, a record of the subsequent user interaction(s) (Operation 222).

In an embodiment, the third-party analytics service updates the machine learning model (Operation 224), based on data received after applying the user query to the machine learning model. The third-party analytics service may update the machine learning model using unsupervised learning. The third-party analytic service may update the machine learning model based on a record of one or more user interaction(s) with the consumer-facing application subsequent to the consumer-facing application presenting the response to the user query. Alternatively or additionally, the third-party analytics service may update the machine learning model based on the user intent associated with the user query. In general, in an embodiment, updating the machine learning model updates the machine learning engine's function (e.g., a classification function), which may improve the third-party analytics system's ability to provide timely and relevant data based on subsequent user queries.

4. Providing Third-Party Analytics Via a Virtual Assistant Interface

Figure 3:
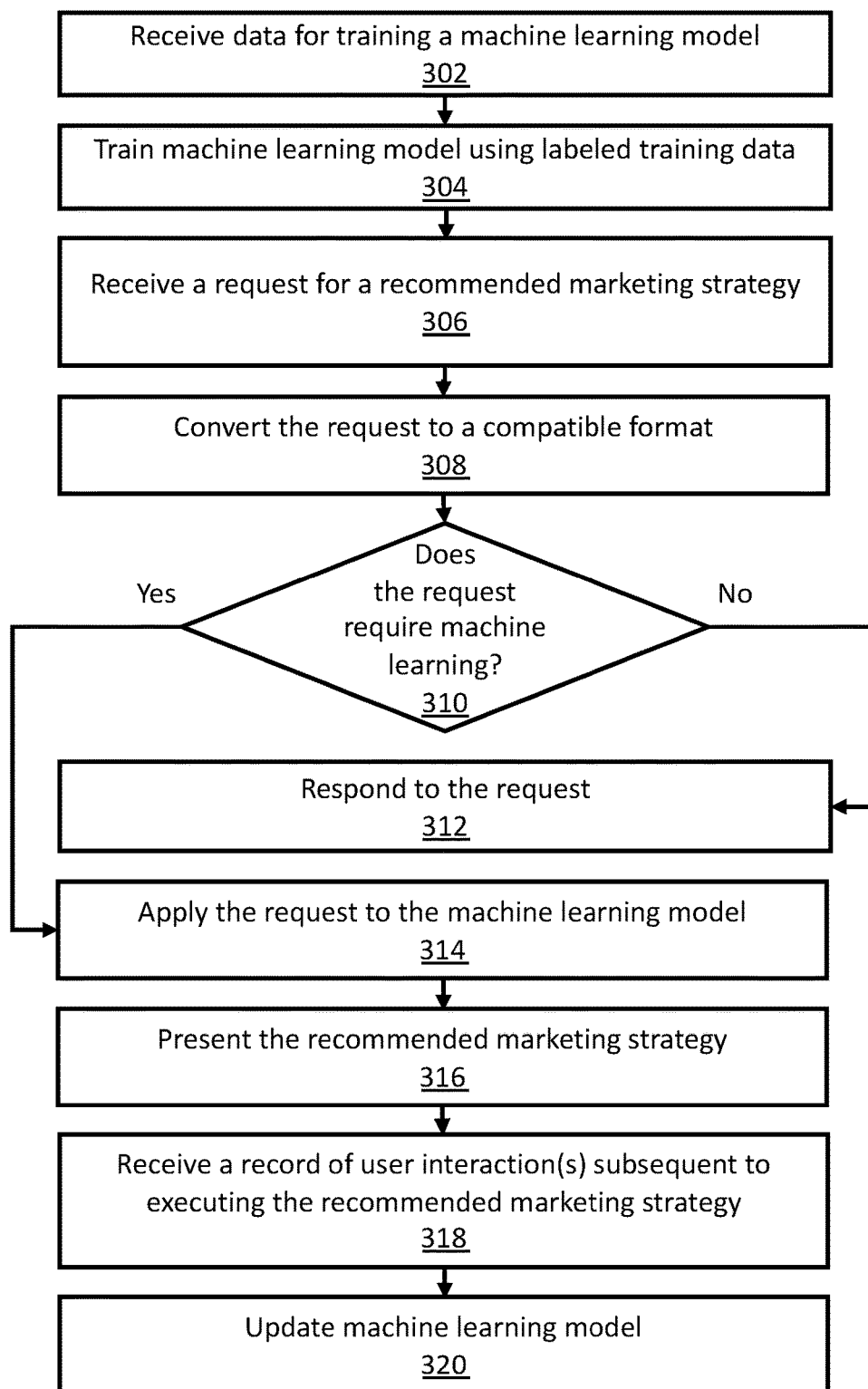
FIG. 3 illustrates a set of operations for providing third-party analytics via a virtual assistant interface in accordance with one or more embodiments.

FIG. 3 illustrates an example set of operations for providing third-party analytics via a virtual assistant interface in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a third-party analytics service receives data for training a machine learning model (Operation 302). As discussed above, the third-party analytics service may receive the data from one or more data sources (e.g., one or more consumer-facing applications) operating independent of the third-party analytics service. The data may include labeled and/or unlabeled data. The data may include one or more of: phrases (i.e., sentences and/or sentence fragments) corresponding to sales offers made to users of a consumer-facing application; records of user interactions with a consumer-facing application; demographic data; sales conversion outcomes; and/or any other kind of data. Alternatively or additionally, the data may include manual user input to the third-party analytics service. For example, the data may include data provided by a sales representative regarding the status of a sale and/or sales campaign workflow, associated with one or more consumers. Data received from manual input may include data that is not available from any consumer-facing application that communicates with the third-party analytics service.

In an embodiment, the third-party analytics service trains a machine learning model using labeled training data (Operation 304). The third-party analytics service may train the machine learning model using labeled training data in which phrases (i.e., sentences and/or sentence fragments) corresponding to sales offers made to users of a consumer-facing application are mapped to supervisory signals that include sales conversion outcomes associated with the corresponding phrases. Alternatively or additionally, the third-party analytics service may train the machine learning model using labeled training data in which interaction histories, demographic attributes, and/or another kind of data or combination thereof associated with consumers is/are mapped to sales outcomes (e.g., completed sales, abandoned virtual shopping carts, progress in a sales campaign workflow, and/or any other kind of sales outcome). Alternatively or additionally, the third-party analytics service may train the machine learning model using another kind of labeled training data or combination thereof. In an embodiment, the machine learning model is trained to predict, from a set of available marketing strategies, a recommended marketing strategy to be targeted at one or more consumers. For example, the machine learning model may be configured to predict which marketing strategy is mostly likely to result in the user buying a product or service, and/or advancing to a next step in a sales campaign workflow. As another example, the machine learning model may be configured to predict which marketing strategy is most likely to satisfy a marketing metric, such as a total number of sales (which may be associated with a sales quota), profit margin, and/or any other kind of marketing metric or combination thereof. As another example, the machine learning model may be configured to predict which consumers to target, given a particular product and/or marketing objective. The machine learning model may be configured to provide many different kinds of information, based on many different inputs and/or criteria.

In an embodiment, the third-party analytics service receives a request for a recommended marketing strategy (Operation 306). The third-party analytics service may receive the request via a virtual assistant interface. In one example, a user (e.g., a sales representative) of the third-party analytics service speaks the request as voice input to a user interface (e.g., a voice input interface in a mobile device and/or another kind of user interface). The user interface transmits the request as voice input to the virtual assistant interface. The virtual assistant interface performs speech-to-text processing to convert the request to text. The virtual assistant interface then transmits the text version of the request to the third-party analytics service. The third-party analytics service may receive the request in many different ways.

In an embodiment, the third-party analytics service converts the request (Operation 308) to a format that is compatible with the machine-learning model. Alternatively or additionally, the virtual assistant interface and/or another system component may perform some or all of the conversion. Converting the request may normalize the request by, for example, removing superfluous terms (e.g., prepositions and/or other terms lacking semantic significance). Converting the request may associate the request with a user intent, i.e., an expressed desire by the user for the third-party analytics service to perform a particular task (e.g., provide a particular set of information). Alternatively or additionally, the third-party analytics system may store the full request as the user intent.

In an embodiment, converting the request to a compatible format uses semantic analysis. Semantic analysis refers to programmatic techniques for determining a meaning associated with words in a human language (i.e., individual words, sentences, passages, etc.). As one example, the request includes words in a human language, e.g., in the form of a natural language question and/or instruction. Semantic analysis may determine a meaning associated with the request. The meaning may correspond to a user intent. The meaning determined by semantic analysis may correspond to a predicted meaning based on analysis of prior inputs. Many different techniques for semantic analysis exist. In an embodiment, semantic analysis uses machine learning to determine a meaning by applying the input word(s) to a machine learning model, which may be the same or different from a machine learning model used for other purposes described herein. Alternatively or additionally, semantic analysis may use semantic analysis techniques that do not involve machine learning. For example, semantic analysis may process input against a fixed grammar and vocabulary, using decision tree analysis and/or another form of semantic analysis techniques or combination thereof.

In an embodiment, the consumer-facing application determines whether the request requires machine learning (Operation 310). The third-party analytics service may be configured to respond to some requests without relying on machine learning. In one example, the third-party analytics service stores information about the status of deals with individual customers. If the request is for the status of a particular deal, the third-party analytics service may respond to the request with the requested information, without relying on any machine learning. In general, in an embodiment, if the request does not require machine learning, then the third-party analytics service responds to the request (Operation 312). Specifically, the third-party analytics service generates the response and transmits the response to the user (e.g., via the virtual assistant interface) without applying the request to a machine learning model.

In an embodiment, if the request requires machine learning, the third-party analytics service applies the request to a machine learning model (Operation 314), to obtain data responsive to the request. For example, if the request is for a recommended marketing strategy for a particular set of one or more consumers, the machine learning model may supply a recommended marketing strategy that is predicted to be successful for the consumer(s). The recommended marketing strategy may correspond to a particular promotion to run (e.g., a sale on a particular day and/or in a particular amount/percentage), a particular subset of the consumers to target, a particular product to promote, a particular platform on which to promote a product, a particular sales associate to assign to interact with one or more consumers, and/or any other kind of marketing strategy or combination thereof. In general, the recommended marketing strategy may be based on one or more environmental conditions associated with the request. As used herein, the term "environmental condition" refers to a condition, represented in one or more data attributes, that materially distinguishes one request from another request. For example, an environmental condition may correspond to a location, a time of year, a day of the week, proximity to a holiday, demographic data associated with one or more consumers, and/or any other kind of environmental condition or combination thereof. In an embodiment, the third-party analytics service presents the recommended marketing strategy responsive to the request (Operation 316). The third-party analytics service may present the recommended marketing strategy via a virtual assistant interface.

In an embodiment, after the user receives the response from the third-party analytics service, the user may take one or more actions using the third-party analytics service. For example, the user may input data indicating execution of the recommended marketing strategy and/or one or more sales outcomes subsequent to execution of the recommended marketing strategy. Alternatively or additionally, one or more consumers may take one or more actions, related to the recommended marketing strategy, using a consumer-facing application. For example, a consumer may purchase a promoted product using the consumer-facing application. In general, the action(s) of the user(s) of the third-party analytics service and/or consumer-facing application may be referred to collectively as one or more user interaction(s). The third-party analytics service may receive a record of the user interaction(s) (Operation 318).

In an embodiment, the third-party analytics service updates the machine learning model (Operation 320), based on data received after supplying the recommended marketing strategy. The third-party analytics service may update the machine learning model using unsupervised learning. The third-party analytic service may update the machine learning model based on a record of one or more user interaction(s), as described above, subsequent to the third-party analytics service supplying the recommended marketing strategy. Alternatively or additionally, the third-party analytics service may update the machine learning model based on the user intent associated with the request. In general, in an embodiment, updating the machine learning model improves the third-party analytics system's ability to provide timely and relevant marketing strategy recommendations.

5. Illustrative Examples

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 4:
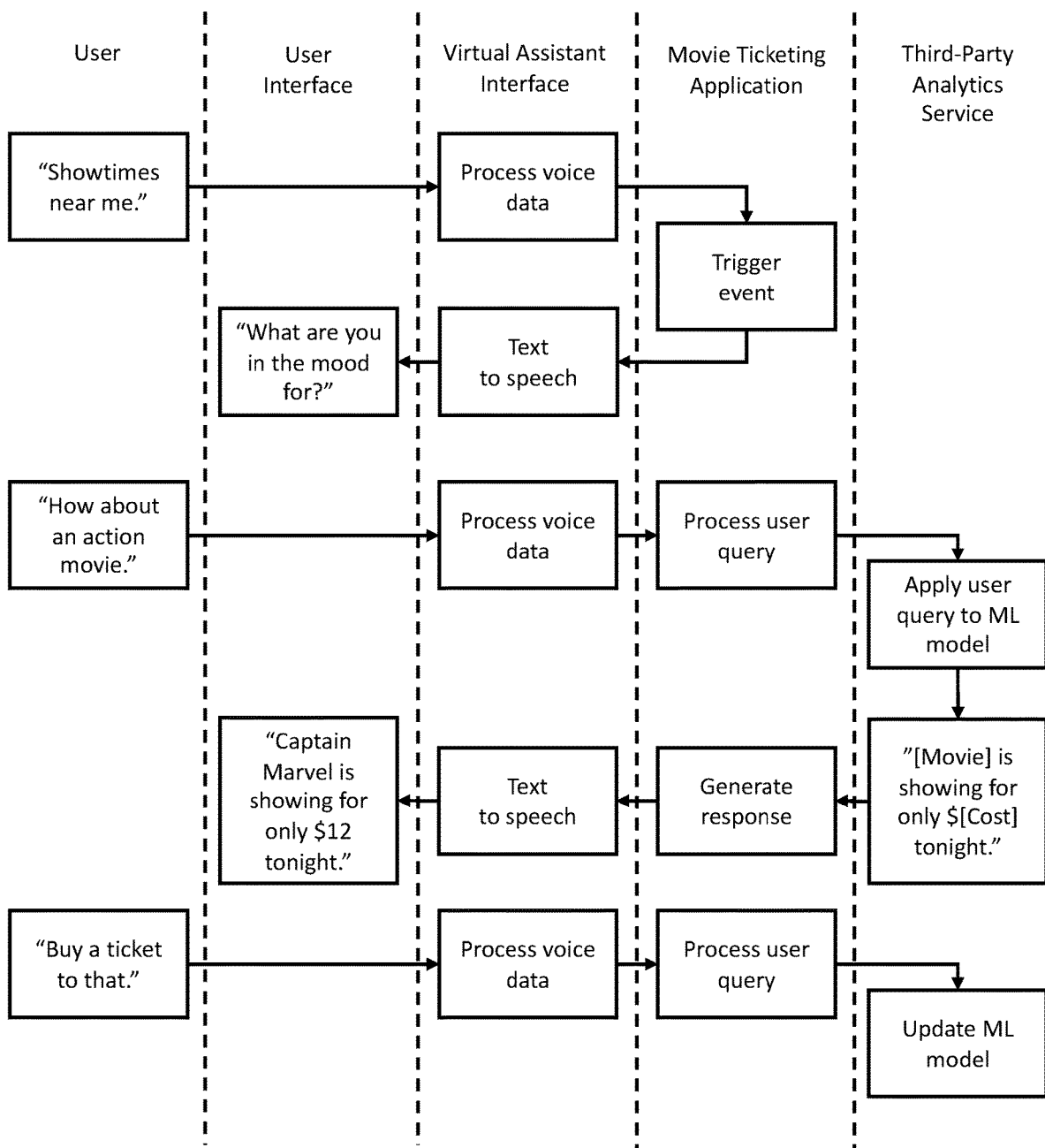
FIGS. 4-5 illustrate examples of integrating third-party analytics with a virtual-assistant enabled application in accordance with one or more embodiments.

5.1. Integrating Third-Party Analytics with a Virtual-Assistant Enabled Application FIG. 4 illustrates an example of integrating third-party analytics with a virtual-assistant enabled application in accordance with one or more embodiments. In this example, the consumer-facing application is a movie ticketing application. The movie ticketing application may be an application running on a mobile device (e.g., a smart phone or tablet) that includes a virtual assistant interface. The user in this example is an individual operating the mobile device.

In this example, the user speaks into the mobile device with the voice query, "Showtimes near me." The virtual assistant interface receives the voice query and performs speech-to-text to obtain a text version of the user query. The virtual assistant interface determines that the user query is directed to the movie ticketing application and transmits the text of the user query to the movie ticketing application. Transmitting the text of the user query to the movie ticketing application triggers an event in the movie ticketing application. In this example, the event corresponds to a request for showtimes. The movie ticketing application determines that this user query does not require third-party analytics and handles the user query by preparing a text response, "What are you in the mood for?" The movie ticketing application transmits the text response to the virtual assistant interface, which performs text-to-speech and presents the response to the user in a user interface (in this example, using a speaker system in the mobile device).

Based on the movie ticketing application's initial response, the user speaks into the mobile device with a second voice query, "How about an action movie." The virtual assistant interface receives the voice query and performs speech-to-text to obtain a text version of the user query. The virtual assistant interface determines that the user query is directed to the movie ticketing application and transmits the text of the user query to the movie ticketing application. The movie ticketing application processes the text and determines that this user query requires third-party analytics. Specifically, the movie ticketing application is configured to obtain marketing phrases, responsive to user queries of this kind, from a third-party analytics service. The movie ticketing application transmits the user query to a third-party analytics service. The third-party analytics service applies the user query to a machine learning model, to obtain a recommended marketing phrase, "[Movie] is showing for only $[cost] tonight." The terms "[Movie]" and [Cost]" are placeholders for data to be supplied by the movie ticketing application itself. In this example, the recommended marketing phrase is a phrase, from a set of available phrases, that the machine learning model predicts will be most successful at selling a ticket for the user. For example, the prediction may be based on the user's location and/or other demographic attribute(s), the user's past purchasing history, and/or any other kind of data that may inform the prediction.

After determining the recommended marketing phrase, the third-party analytics service transmits the recommended marketing phrase to the movie ticketing application. The movie ticketing application generates a response to the user query by filling in the placeholders in the recommended phrase. In this example, the movie ticketing application fills in the placeholders with data corresponding to the top-selling action movie at the time. The movie ticketing application may fill in a placeholder based on many different criteria. The movie ticketing application transmits the text response to the virtual assistant interface, which performs text-to-speech and presents the response to the user in a user interface (in this example, using a speaker system in the mobile device).

Based on the movie ticketing application's initial response, the user speaks into the mobile device with a third voice query, "Buy a ticket to that." The virtual assistant interface receives the voice query and performs speech-to-text to obtain a text version of the user query. The virtual assistant interface determines that the user query is directed to the movie ticketing application and transmits the text of the user query to the movie ticketing application. The movie ticketing application processes the text. In this case, the movie ticketing application proceeds to purchase the requested ticket using stored payment data. In addition, the movie ticketing application transmits a record of the purchase to the third-party analytics service. The third-party analytics service uses the record to update the machine learning model. Based on the purchase, the third-party analytics service may be more likely to recommend the same marketing phrase for subsequent user queries having similar characteristics.

Figure 5:
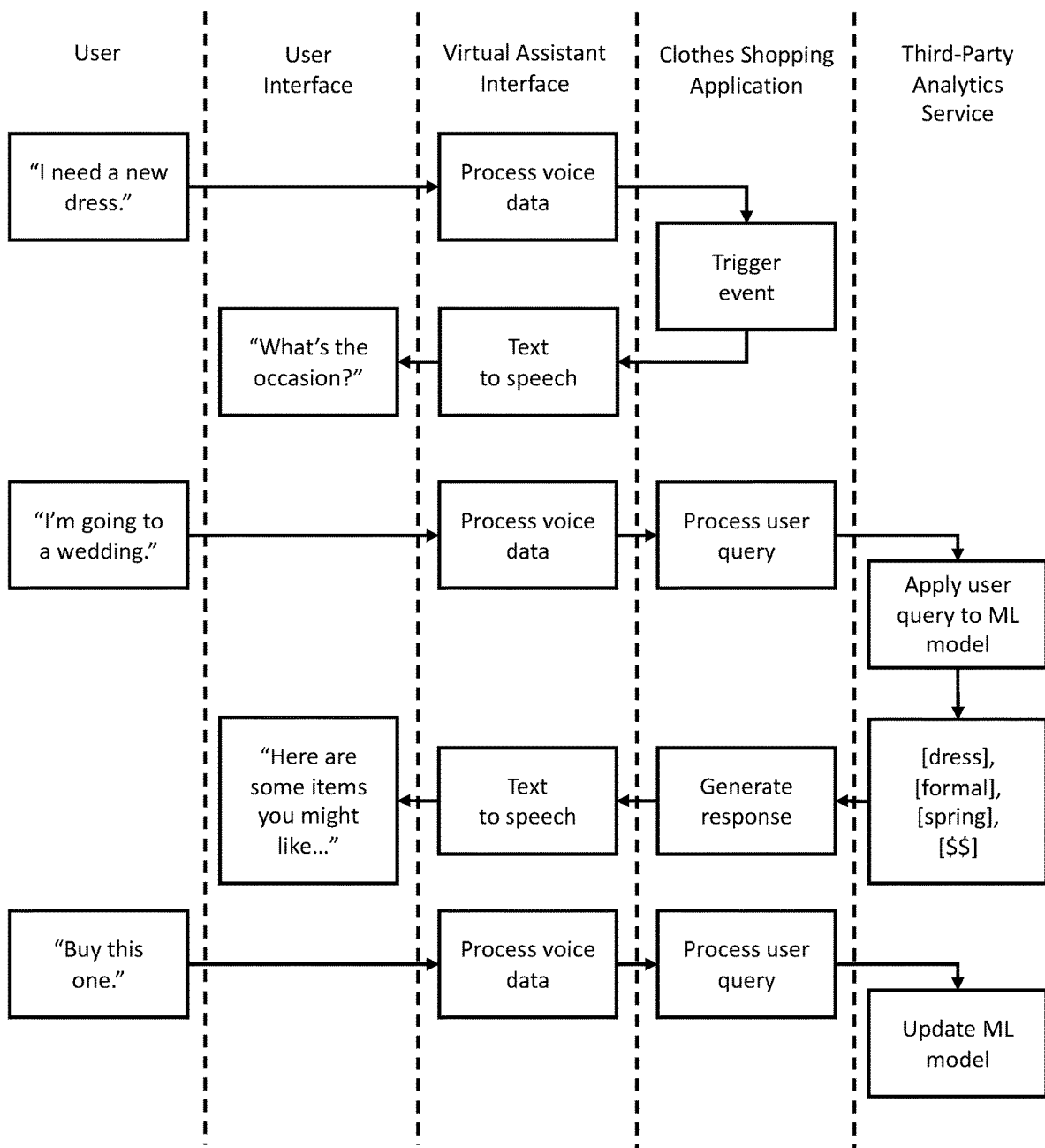

FIG. 5 illustrates an example of integrating third-party analytics with a virtual-assistant enabled application in accordance with one or more embodiments. In this example, the consumer-facing application is a clothes shopping application. The clothes shopping application may be an application running on a mobile device (e.g., a smart phone or tablet) that includes a virtual assistant interface. The user in this example is an individual operating the mobile device.

In this example, the user speaks into the mobile device with the voice query, "I need a new dress." The virtual assistant interface receives the voice query and performs speech-to-text to obtain a text version of the user query. The virtual assistant interface determines that the user query is directed to the clothes shopping application and transmits the text of the user query to the clothes shopping application. Transmitting the text of the user query to clothes shopping application triggers an event in the clothes shopping application. In this example, the event corresponds to a request for information about clothes products for sale. The clothes shopping application determines that this user query does not require third-party analytics and handles the user query by preparing a text response, "What's the occasion?" The clothes shopping application transmits the text response to the virtual assistant interface, which performs text-to-speech and presents the response to the user in a user interface (in this example, using a speaker system in the mobile device).

Based on the clothes shopping application's initial response, the user speaks into the mobile device with a second voice query, "I'm going to a wedding." The virtual assistant interface receives the voice query and performs speech-to-text to obtain a text version of the user query. The virtual assistant interface determines that the user query is directed to the clothes shopping application and transmits the text of the user query to the clothes shopping application. The clothes shopping application processes the text and determines that this user query requires third-party analytics. Specifically, the clothes shopping application is configured to obtain recommended product filters, responsive to user queries of this kind, from a third-party analytics service. The clothes shopping application transmits the user query to a third-party analytics service. The third-party analytics service applies the user query to a machine learning model, to obtain a recommended set of product filters: "dress" indicating a category of clothing; "formal" indicating a sub-category of clothing; "spring" indicating another sub-category of clothing, and "$$" indicating a price range. In this example, the recommended filters are filters, from a set of available filters, that the machine learning model predicts will be most successful at selling a clothing item to the user. For example, the prediction may be based on the indicated occasion (a wedding), the time of year (spring or approaching spring), the user's location and/or other demographic attribute(s), the user's past purchasing history, and/or any other kind of data that may inform the prediction.

After determining the recommended filters, the third-party analytics service transmits the recommended filters to the clothes shopping application. The clothes shopping application generates a response to the user query by applying the recommended filters to a set of available clothing for sale, to obtain a filtered set of products. The clothes shopping application transmits information about the filtered set of products, along with a text response, to the virtual assistant interface, which performs text-to-speech and presents the response to the user in a user interface (in this example, using a speaker system in the mobile device and a screen display of information corresponding to the filtered set of products).

Based on the clothes shopping application's initial response, the user speaks into the mobile device with a third voice query, "Buy this one." For example, the user may speak the query while viewing details of a particular recommended dress. The virtual assistant interface receives the voice query and performs speech-to-text to obtain a text version of the user query. The virtual assistant interface determines that the user query is directed to the clothes shopping application and transmits the text of the user query to the clothes shopping application. The clothes shopping application processes the text. In this case, the clothes shopping application proceeds to purchase the requested dress using stored payment data. In addition, the clothes shopping application transmits a record of the purchase to the third-party analytics service. The third-party analytics service uses the record to update the machine learning model. Based on the purchase, the third-party analytics service may be more likely to recommend the same filters for subsequent user queries having similar characteristics.

5.2. Providing Third-Party Analytics Via a Virtual Assistant Interface

Figure 6:
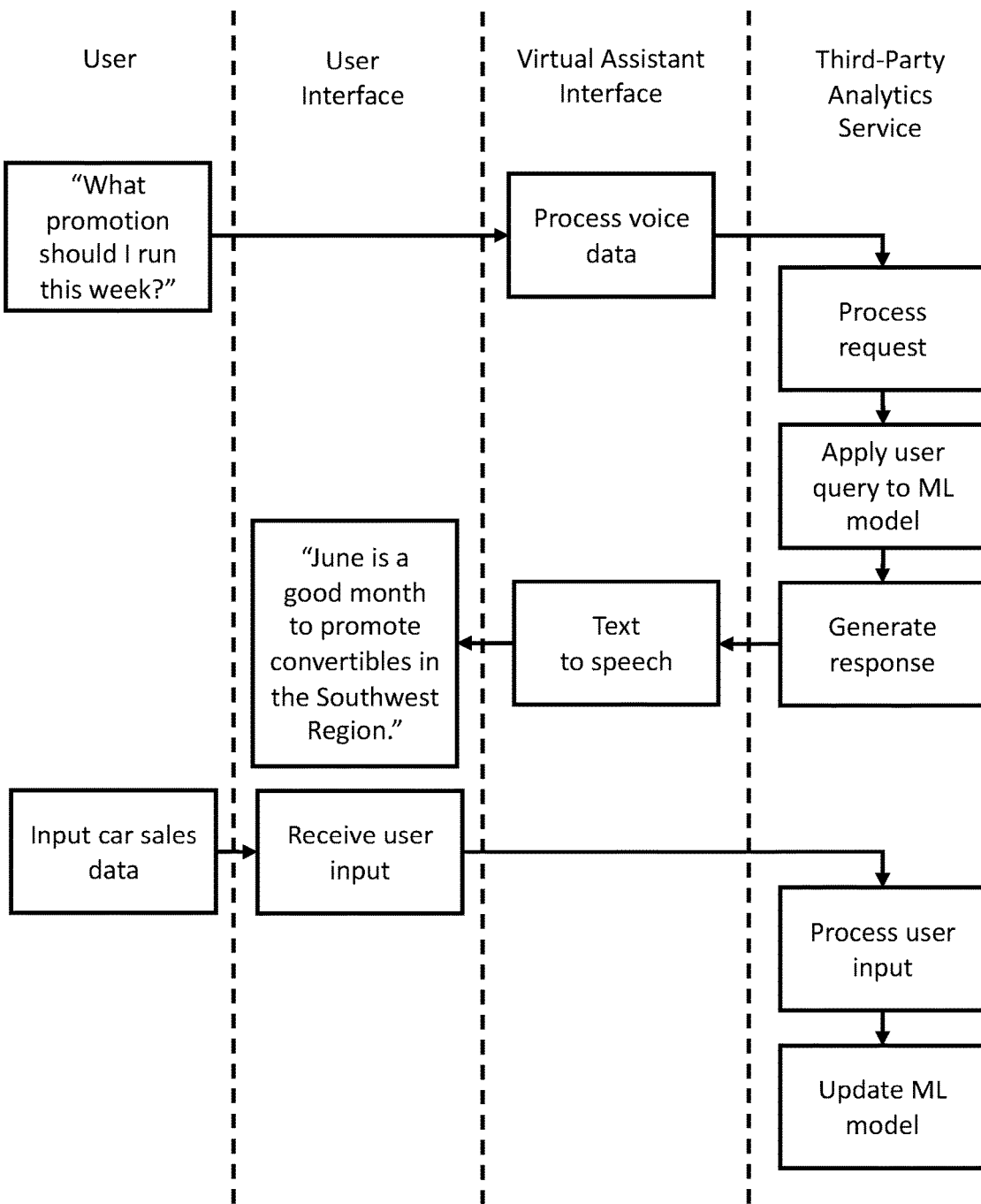
FIG. 6 illustrates an example of providing third-party analytics via a virtual assistant interface in accordance with one or more embodiments.

FIG. 6 illustrates an example of providing third-party analytics via a virtual assistant interface in accordance with one or more embodiments. In this example, the user is a marketing director for a car dealership, interested in running a promotion to sell more cars. The user may access a third-party analytics service using a mobile device (e.g., a smart phone or tablet) that includes a virtual assistant interface.

In this example, the user speaks into the mobile device with the voice query, "What promotion should I run this week?" The virtual assistant interface receives the voice query and performs speech-to-text to obtain a text version of the user query. The virtual assistant interface determines that the user query is directed to the third-party analytics service and transmits the text of the user query to the third-party analytics service. The third-party analytics service processes the request by performing semantic analysis to determine the user's intent (i.e., a request for a recommended marketing strategy to promote car sales). The third-party analytics service applies the request to a machine learning model, to determine a recommended marketing strategy responsive to the request. Based on the output of the machine learning model, the third-party analytics service generates a response, which in this case includes a natural language phrase that includes the recommendation. The third-party analytics service transmits the response to the virtual assistant interface, which performs text-to-speech and presents the response to the user in a user interface (in this example, using a speaker system in the mobile device).

Based on the third-party analytics service's response, the marketing director executes the recommended marketing strategy (i.e., runs a promotional campaign for convertibles in the Southwest sales region). Subsequent to executing the recommended marketing strategy, the marketing director and/or another user (e.g., a sales representative) inputs car sales data via a user interface (which may the same user interface or a different user interface from that used to submit the initial request). The third-party analytics service receives the car sales data and processes the car sales data by normalizing the data to a format that is compatible with the machine learning model. The third-party analytics service uses unsupervised learning to update the machine learning model based on the car sales data. Based on the car sales, the third-party analytics service may be more or less likely (e.g., depending on whether the car sales data indicates sales of convertibles) to recommend the same marketing strategy for subsequent requests having similar characteristics.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
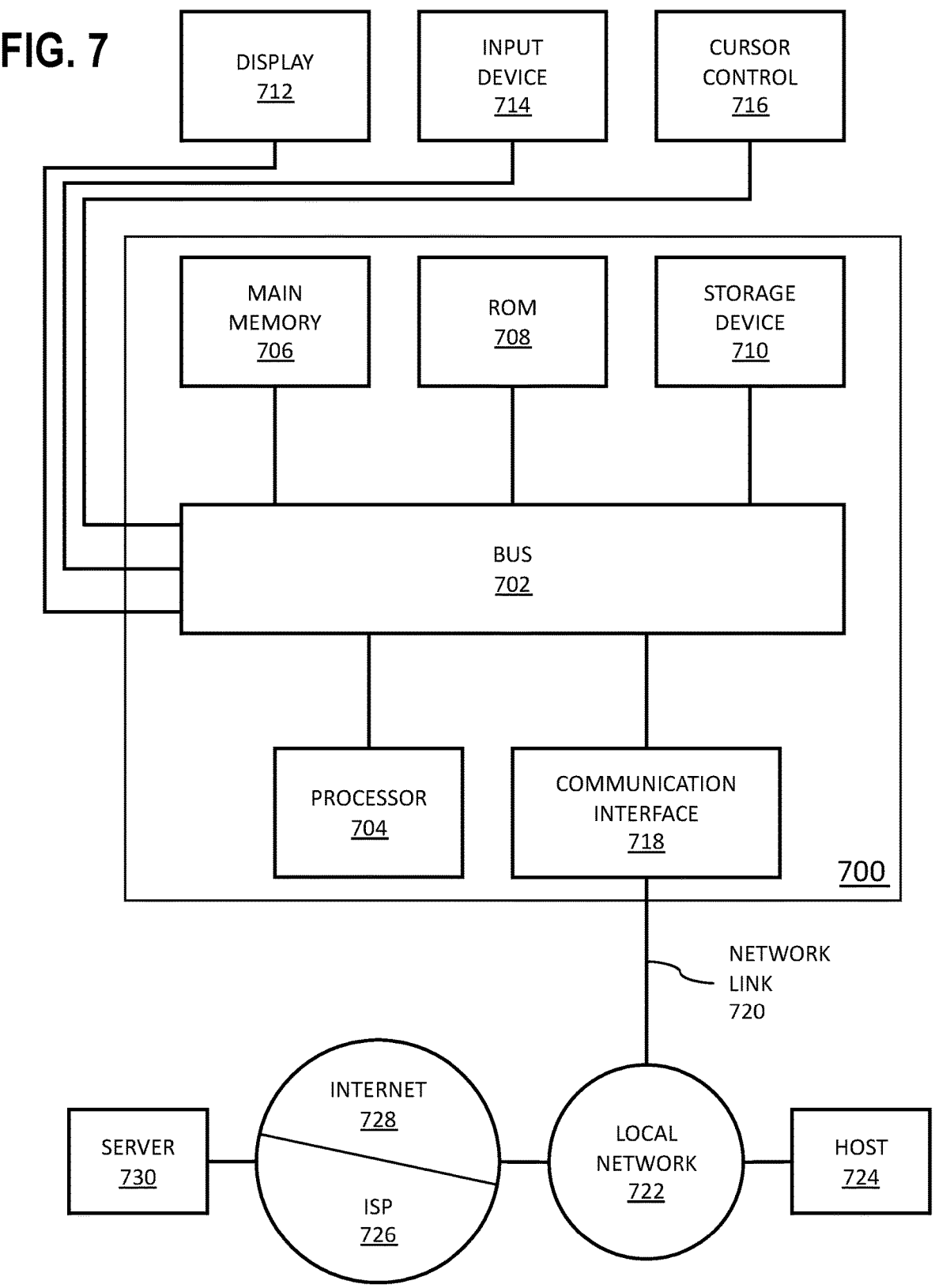
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

training a machine learning model, using a set of labeled training data comprising (a) a plurality of phrases corresponding to sales offers made to users of a first consumer-facing application and (b) sales conversion outcomes associated, respectively, with the plurality of phrases;

receiving, by a third-party analytics service from the first consumer-facing application, a user query submitted by a first user of the first consumer-facing application via a virtual assistant interface;

applying, by the third-party analytics service, the user query to the machine learning model to obtain a recommended phrase for the first consumer-facing application to use in a response to the user query, wherein the recommended phrase is:

(a) based on one or more of the plurality of phrases used to train the machine learning model, (b) responsive to the user query, and (c) based on a likelihood of achieving a sales objective associated with the first consumer-facing application;

transmitting, by the third-party analytics service to the first consumer-facing application, the recommended phrase, wherein the first consumer-facing application uses the recommended phrase to supply the response to the user query via the virtual assistant interface;

updating, using an unsupervised learning process, the machine learning model based on at least one interaction between the first user and the virtual assistant interface subsequent to the response to the user query; and optimizing one or more features of data transmitted by the third-party analytics service to consumer-facing applications based on the updated machine learning model.

2. The one or more media of claim 1, further storing instructions which, when executed by one or more processors, cause:

transmitting, by the third-party analytics service to the first consumer-facing application, one or more product filters for the first consumer-facing application to apply to a set of available products;

wherein the first consumer-facing applies the one or more product filters to the set of available products to obtain a filtered set of one or more products to offer in the response to the user query.

3. The one or more media of claim 2, wherein the recommended phrase comprises a placeholder for the filtered set of one or more products.

4. The one or more media of claim 1, further storing instructions which, when executed by one or more processors, cause:

transmitting, by the third-party analytics service to the first consumer-facing application, a recommended next step in a sales campaign workflow for the response to the user query.

5. The one or more media of claim 1, further storing instructions which, when executed by one or more processors, cause:

after receiving the user query, training the machine learning model using unsupervised learning, based at least on the user query.

6. The one or more media of claim 1, further storing instructions which, when executed by one or more processors, cause:

receiving, by the third-party analytics service, a record of an interaction of the first user with the first consumer-facing application subsequent to the first consumer-facing application supplying the response to the user query;

training the machine learning model using unsupervised learning, based at least on the record of the interaction of the first user with the first consumer-facing application.

7. The one or more media of claim 1, further storing instructions which, when executed by one or more processors, cause:

performing semantic analysis on the user query to generate a normalized user intent associated with the user query.

8. The one or more media of claim 1, wherein the virtual assistant interface comprises a voice interface and the user query comprises voice data.

9. The one or more media of claim 8, further storing instructions which, when executed by one or more processors, cause:

converting the user query to text, before applying the user query to the machine learning model.

10. The one or more media of claim 1:

wherein the sales objective comprises a sales conversion rate;

wherein the recommended phrase is selected based on the recommended phrase having a highest predicted sales conversion rate of a plurality of predicted sales conversion rates computed by the machine learning model for the user query.

11. The one or more media of claim 1:

wherein the user query requests information about one or more particular goods or services;

wherein the machine learning model predicts that the recommended phrase is effective for converting sales of the one or more particular goods or services.

12. The one or more media of claim 1, wherein the set of labeled training data further comprises a first interaction history of the first user of the first consumer-facing application.

13. The one or more media of claim 12, wherein the set of labeled training data further comprises a second interaction history of a second user of the first consumer-facing application.

14. The one or more media of claim 12, wherein the set of labeled training data further comprises a second interaction history of a second user of a second consumer-facing application.

15. The one or more media of claim 1, wherein the set of labeled training data further comprises demographic data associated with sales outcomes.

16. The one or more media of claim 15, wherein at least a subset of the demographic data comprises anonymized data.

17. The one or more media of claim 15, wherein at least a subset of the demographic data is from a second consumer-facing application operating independent of the first consumer-facing application.

18. The one or more media of claim 15, further storing instructions which, when executed by one or more processors, cause:

receiving, by the third-party analytics service, the demographic data from one or more data sources operating independent of the third-party analytics service.

19. A system comprising: at least one device including a hardware processor; the processor being configured to perform operations comprising:

training a machine learning model, using a set of labeled training data comprising (a) a plurality of phrases corresponding to sales offers made to users of a first consumer-facing application and (b) sales conversion outcomes associated, respectively, with the plurality of phrases; receiving, by a third-party analytics service from the first consumer-facing application, a user query submitted by a first user of the first consumer-facing application via a virtual assistant interface;

applying, by the third-party analytics service, the user query to the machine learning model to obtain a recommended phrase for the first consumer-facing application to use in a response to the user query, wherein the recommended phrase is:

(a) based on one or more of the plurality of phrases used to train the machine learning model, (b) responsive to the user query, and (c) based on a likelihood of achieving a sales objective associated with the first consumer-facing application;

transmitting, by the third-party analytics service to the first consumer-facing application, the recommended phrase, wherein the first consumer-facing application uses the recommended phrase to supply the response to user query via the virtual assistant interface;

at least one interaction between the first user and the virtual assistant interface subsequent to the response to the user query; and optimizing one or more features of data transmitted by the third-party analytics service to consumer-facing applications based on the updated machine learning model.

20. A method comprising:

training a machine learning model, using a set of labeled training data comprising (a) a plurality of phrases corresponding to sales offers made to users of a first consumer-facing application and (b) sales conversion outcomes associated, respectively, with the plurality of phrases; receiving, by a third-party analytics service from the first consumer-facing application, a user query submitted by a first user of the first consumer-facing application via a virtual assistant interface;

applying, by the third-party analytics service, the user query to the machine learning model to obtain a recommended phrase for the first consumer-facing application to use in a response to the user query, wherein the recommended phrase is:

(a) based on one or more of the plurality of phrases used to train the machine learning model, (b) responsive to the user query, and (c) based on a likelihood of achieving a sales objective associated with the first consumer-facing application;

transmitting, by the third-party analytics service to the first consumer-facing application, the recommended phrase, wherein the first consumer-facing application uses the recommended phrase to supply the response to user query via the virtual assistant interface;

updating, using an unsupervised learning process, the machine learning model based on at least one interaction between the first user and the virtual assistant interface subsequent to the response to the user query; and optimizing one or more features of data transmitted by the third-party analytics service to consumer-facing applications based on the updated machine learning model.

\* \* \* \* \*

UNITED STATES PATENT AND TRADEMARK OFFICE
CERTIFICATE OF CORRECTION

| | |
|---|---|
| PATENT NO. | : 11,301,896 B2 |
| APPLICATION NO. | : 16/543439 |
| DATED | : April 12, 2022 |
| INVENTOR(S) | : Tiruveedhula |

It is certified that error appears in the above-identified patent and that said Letters Patent is hereby corrected as shown below:

In the Claims

In Column 28, Line 26, in Claim 19, before "at least" insert -- updating, using an unsupervised learning process, the machine learning model based on --, therefor.

Signed and Sealed this
Sixteenth Day of August, 2022

Katherine Kelly Vidal
*Director of the United States Patent and Trademark Office*